US006722892B1

United States Patent
Blakelock

(10) Patent No.: US 6,722,892 B1
(45) Date of Patent: Apr. 20, 2004

(54) MULTI-PLANE ADJUSTABLE CONNECTOR

(75) Inventor: Thomas Richard Blakelock, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/322,442

(22) Filed: Dec. 19, 2002

(51) Int. Cl.⁷ .............................................. H01R 39/00
(52) U.S. Cl. ........................................................ 439/31
(58) Field of Search ............................. 439/6, 31, 165, 439/173; 174/86, 69, 84 R

(56) References Cited

U.S. PATENT DOCUMENTS

| | | | |
|---|---|---|---|
| 3,219,750 A | * | 11/1965 | Davies ........................ 174/69 |
| 4,237,336 A | * | 12/1980 | Kostjukov et al. .......... 174/151 |
| 4,477,689 A | * | 10/1984 | Ogasahara et al. ........... 174/69 |
| 5,267,866 A | * | 12/1993 | Swift et al. .................... 439/31 |
| 6,218,759 B1 | | 4/2001 | Blakelock et al. |
| 6,293,803 B1 | * | 9/2001 | Rust et al. ..................... 439/33 |
| 6,326,547 B1 | * | 12/2001 | Saxby et al. ................... 174/69 |
| 6,331,745 B2 | | 12/2001 | Blakelock et al. |
| 6,347,968 B1 | | 2/2002 | Hamilton et al. |
| 6,453,540 B1 | | 9/2002 | Blakelock et al. |

* cited by examiner

*Primary Examiner*—Renee Luebke
*Assistant Examiner*—Felix O. Figueroa
(74) *Attorney, Agent, or Firm*—Nixon & Vanderhye P.C.

(57) ABSTRACT

A multi-plane adjustable connector facilitates electromechanical connection between armature bar ends in a generator. The connector includes opposing end sections positionable in multiple orientations, and a plurality of interim sections coupled between the opposing end sections. The opposing end sections and interim sections are connected in a series via a plurality of hinges, respectively, where at least one of the plurality of hinges is angled relative to the others.

18 Claims, 2 Drawing Sheets

MULTI-PLANE ADJUSTABLE CONNECTOR

BACKGROUND OF THE INVENTION

The present invention relates to a multi-plane electromechanical connector and, more particularly, a multi-plane adjustable connector suited for effecting solid electromechanical connection between two aligned or misaligned radially adjacent armature bar ends contained within air cooled dynamo generators.

After the installation of armature bars into the stator frame of a generator, two radially adjacent bar ends need to be electrically connected. If the bar ends are not in alignment, either the ends of the bars need to be moved into alignment, or the connectors need to be adjusted to match the misalignment. In some instances, both are required. The process of moving the bar ends, however, puts the bar integrity at risk. Additionally, the modification of connectors is costly and time consuming. Reduction in risk, cost and time in enabling a generator to be back in service are of course of high priority.

Presently, armature bars are jacked into alignment, which however put the bar insulation in a high fatigue, high potential failure risk situation. Still further, such jacking does not necessarily guarantee alignment. An alternative solution has been to measure the misalignment of each bar connection, then cut and bend solid copper connector plates to accommodate the misalignment. This process, however, could result in more than 100 custom made different connectors, and such a labor intensive process significantly increases costs and cycle time.

BRIEF DESCRIPTION OF THE INVENTION

In an exemplary embodiment of the invention, a multi-plane adjustable connector includes a first connector end section including a first half of a first connector hinge mechanism; a first interim section including a second half of the first connector hinge mechanism on one side thereof and a first half of an angled hinge mechanism on an opposite side thereof, the angled hinge mechanism being angled relative to the first connector hinge mechanism; a second interim section including a second half of the angled hinge mechanism on one side thereof and a first half of an angled continuation hinge mechanism on an opposite side thereof; a third interim section including a second half of the angled continuation hinge mechanism on one side thereof and a first half of a second connector hinge mechanism on an opposite side thereof; and a second connector end section including a second half of the second connector hinge mechanism.

In another exemplary embodiment of the invention, a multi-plane adjustable connector includes opposing end sections positionable in multiple orientations; and a plurality of interim sections coupled between the opposing end sections. The opposing end sections and interim sections are connected in a series via a plurality of hinges, respectively, where at least one of the plurality of hinges is angled relative to others.

DETAILED DESCRIPTION OF THE INVENTION

Figure 1:
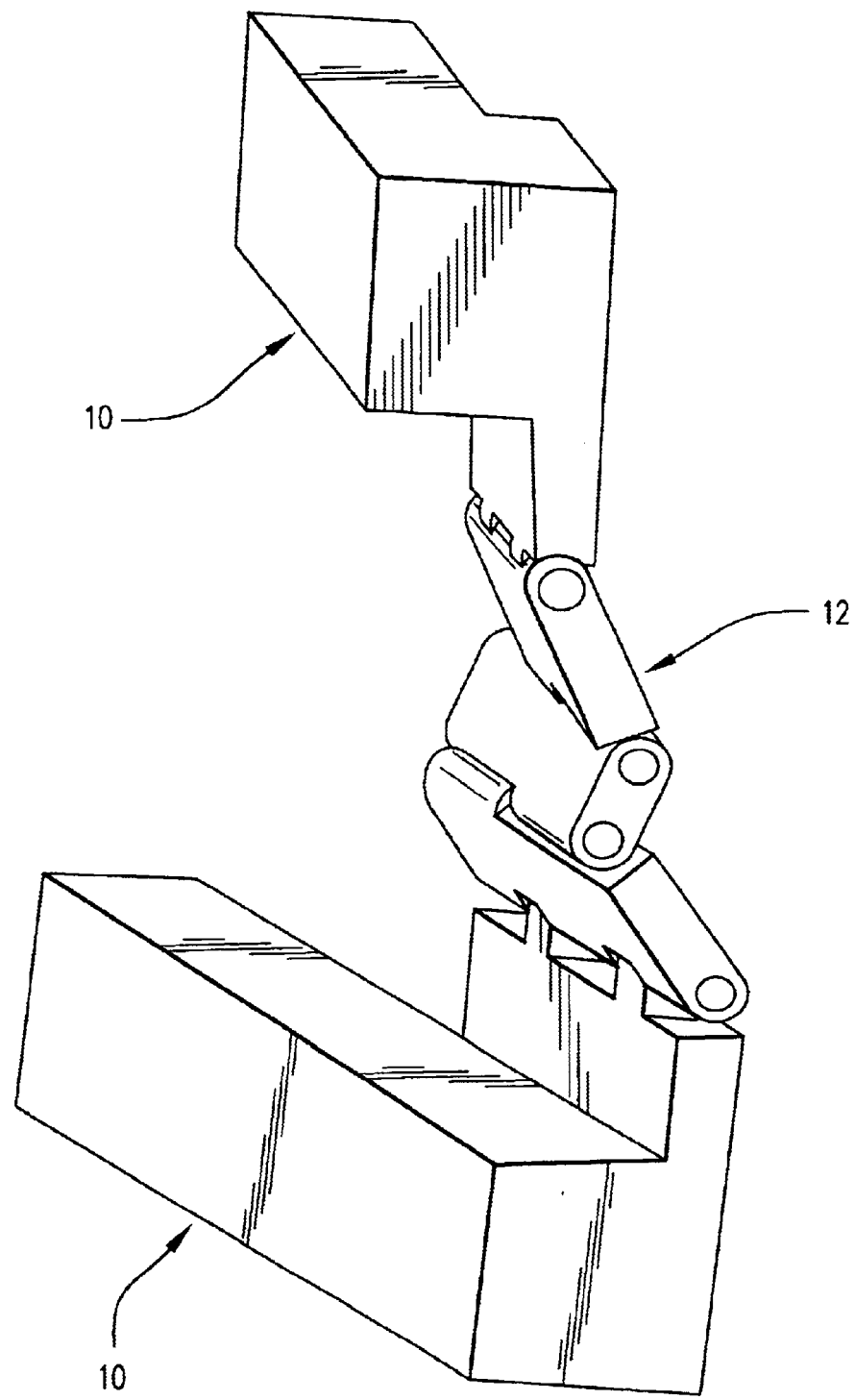
FIG. 1 shows two radially adjacent armature bar ends.

As mentioned above, with reference to FIG. 1, after installation of armature bars into the stator frame of a generator, the two radially adjacent bar ends 10 need to be electrically connected. FIG. 1 shows the bar ends 10 not in alignment such that the ends of the bars either need to be moved into alignment or the connectors need to be adjusted to match the misalignment. The multi-plane adjustable connector of the present invention facilitates the electrical connection between the radially adjacent bar ends 10.

Figure 2:
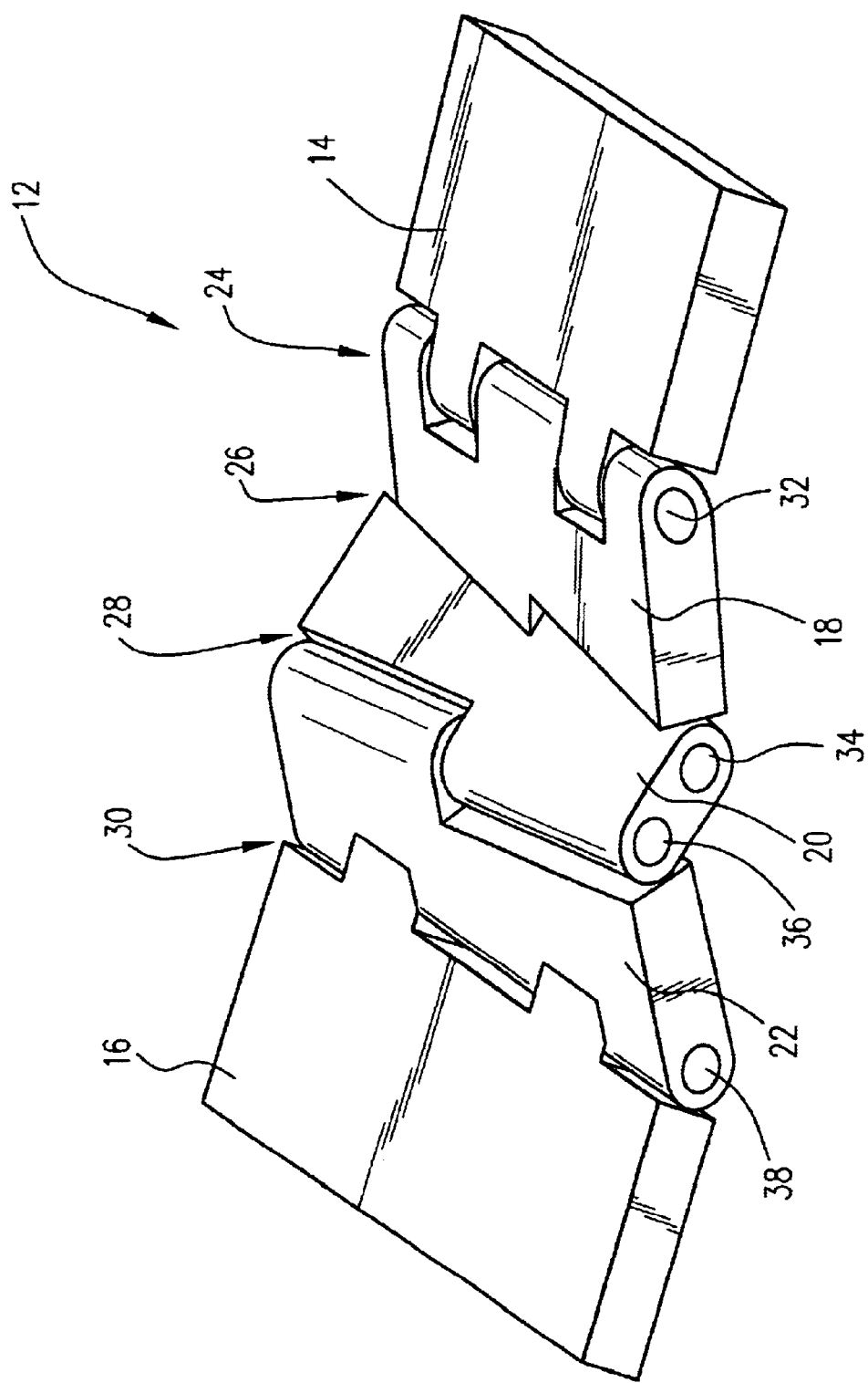
FIG. 2 is a perspective view of the multi-plane adjustable connector of the present invention.

FIG. 2 shows the multi-plane adjustable connector 12 of the present invention. Generally, the connector includes opposing end sections 14, 16, which are ultimately secured to the armature bar ends. A plurality of interim sections 18, 20, 22 are coupled between the opposing end sections 14, 16. The opposing end sections 14, 16 and interim sections 18, 20, 22 are connected in a series as shown in FIG. 2 via a plurality of hinges 24, 26, 28, 30 including a corresponding plurality of hinge pins 32, 34, 36, 38, respectively.

A preferred configuration of the connector 12 of the invention includes a first connector end section 14 including a first half of a first connector hinge mechanism 24. A first interim section 18 includes a second half of the first connector hinge mechanism 24 on one side thereof and a first half of an angled hinge mechanism 26 on an opposite side thereof. As shown in FIG. 2, the angled hinge mechanism 26 is angled relative to the first connector hinge mechanism 24, for example. The angled hinge mechanism 26 is preferably configured at an angle of about 15–40° relative to for example an angle of the first connector hinge mechanism 24. The angle depends particularly on a size of the armature bars.

A second interim section 20 includes a second half of the angled hinge mechanism 26 on one side thereof and a first half of an angled continuation hinge mechanism 28 on an opposite side thereof. A third interim section 22 includes a second half of the angled continuation hinge mechanism 28 on one side thereof and a first half of a second connector hinge mechanism 30 on an opposite side thereof. Preferably, the angled continuation hinge mechanism 28 is disposed at an opposing (equal and opposite) angle relative to the angled hinge mechanism 26. The second connector end section 16 includes a second half of the second connector hinge mechanism 30.

As shown, the first connector end section 14 is coupled with the first interim section 18 via the first connector hinge mechanism 24. Similarly, the first interim section 18 is coupled with the second interim section 20 via the angled hinge mechanism 26, and the second interim section 20 is coupled with the third interim section 22 via the continuation hinge mechanism 28. Finally, the third interim section 22 is coupled with the second connector end section 16 via the second connector hinge mechanism 30. Each hinge mechanism 24, 26, 28, 30 includes respective hinge pins 32, 34, 36, 38, wherein each hinge mechanism is pivotable about the respective hinge pin. Preferably, the hinge pins 32, 34, 36, 38 are close fit pins.

In order to maximize a range of adjustability, the connector components are typically constructed such that a flat connector side is opposed to a rounded connector side as shown. For example, the first half of the first connector hinge mechanism 24 of the first connector end section 14 is shown with squared or flat ends, while the second half of the first connector hinge 24 on the first interim section 18 is provided with rounded ends. As a consequence, each of the respective hinge mechanisms 24, 26, 28, 30 can typically pivot through about 180°.

Preferably, the hinge pins 32, 34, 36, 38, the first and second connector end sections 14, 16, and the first, second and third interim sections 18, 20, 22 are formed of copper, although other conducting materials may be suitable provided they can be appropriately brazed or welded. Aluminum is an example of a suitable alternative material. Additionally, the components of the connector 12 including the hinge pins may be pretreated with braze material for the final braze process that would solidify the assembly and attach the assembly to the armature bar ends 10.

The connector components are typically machined into desired shapes using conventional machining methodologies. The components may alternatively be stamped or otherwise constructed, although it is desirable to at least machine the openings for the hinge pins to ensure a close fit.

The connector 12 of the present invention is shown in FIG. 2 with three interim sections 18, 20, 22 and two angled hinge mechanisms 26, 28. The invention, however, is not necessarily meant to be limited to the illustrated construction. Rather, fewer or additional interim sections may be incorporated, and only one or more than two angled hinge mechanisms may also be incorporated. Of course, the hinges may also have varying constructions including different numbers of fingers, etc. Still further, although the hinge mechanisms are shown with rounded ends facing flat ends, the specific constructions may be varied to suit manufacturing preferences, or alternatively all of the ends may be formed in a rounded construction.

With the connector of the present invention, electrical and mechanical connections of adjacent armature bar ends are facilitated without the need to machine, mold or modify the connectors or the position of the armature bar ends.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A multi-plane adjustable connector comprising:
   opposing end sections positionable in multiple orientations; and
   a plurality of interim sections coupled between the opposing end sections, wherein the opposing end sections and interim sections are connected in a series via a plurality of hinges, respectively, at least one of the plurality of hinges being angled at an angle of about 15–40° relative to others.

2. A multi-plane adjustable connector according to claim 1, wherein the opposing end sections and the plurality of interim sections are formed of copper.

3. A multi-plane adjustable connector according to claim 1, wherein the opposing end sections and the plurality of interim sections are pretreated with braze material.

4. A multi-plane adjustable connector according to claim 1, comprising two angled hinges disposed at opposing angles of about 15–40° relative to the other hinges.

5. A multi-plane adjustable connector according to claim 1, wherein the plurality of hinges are secured via a corresponding plurality of hinge pins.

6. A multi-plane adjustable connector according to claim 5, wherein each hinge is pivotable through about 180°.

7. A multi-plane adjustable connector according to claim 5, wherein the hinge pins, the opposing end sections and the plurality of interim sections are formed of copper.

8. A multi-plane adjustable connector according to claim 5, wherein the hinge pins, the opposing end sections and the plurality of interim sections are pretreated with braze material.

9. A multi-plane adjustable connector comprising:
   a first connector end section including a first half of a first connector hinge mechanism;
   a first interim section including a second half of the first connector hinge mechanism on one side thereof and a first half of an angled hinge mechanism on an opposite side thereof, the angled hinge mechanism being angled at an angle of about 15–40° relative to the first connector hinge mechanism;
   a second interim section including a second half of the angled hinge mechanism on one side thereof and a first half of an angled continuation hinge mechanism on an opposite side thereof;
   a third interim section including a second half of the angled continuation hinge mechanism on one side thereof and a first half of a second connector hinge mechanism on an opposite side thereof; and
   a second connector end section including a second half of the second connector hinge mechanism.

10. A multi-plane adjustable connector according to claim 9, wherein the first and second connector end sections and the first, second and third interim sections are formed of copper.

11. A multi-plane adjustable connector according to claim 9, wherein the first and second connector end sections and the first, second and third interim sections are pretreated with braze material.

12. A multi-plane adjustable connector according to claim 9, wherein the angled continuation hinge mechanism is disposed at an opposing angle relative to the angled hinge mechanism.

13. A method of connecting first and second armature bar ends in a generator using the multi-plane adjustable connector of claim 12, the method comprising:
    securing one of the opposing end sections to the first armature bar end;
    positioning the other of the opposing end sections adjacent the second armature bar end via the plurality of interim sections; and
    securing the other of the opposing end sections to the second armature bar end.

14. A multi-plane adjustable connector according to claim 9, wherein the first connector end section is coupled with the first interim section via the first connector hinge mechanism; the first interim section is coupled with the second interim section via the angled hinge mechanism; the second interim section is coupled with the third interim section via the angled continuation hinge mechanism; and the third interim section is coupled with the second connector end section via the second connector hinge mechanism.

15. A multi-plane adjustable connector according to claim 14, wherein each hinge mechanism comprises a hinge pin, wherein each hinge mechanism is pivotable about the respective hinge pin.

16. A multi-plane adjustable connector according to claim 15, wherein each hinge mechanism is pivotable through about 180°.

17. A multi-plane adjustable connector according to claim 15, wherein the hinge pins, the first and second connector end sections, and the first, second and third interim sections are formed of copper.

18. A multi-plane adjustable connector according to claim 15, wherein the hinge pins, the first and second connector end sections, and the first, second and third interim sections are pretreated with braze material.

* * * * *